C. L. WAISNER.
APPARATUS FOR MANUFACTURING ROUGE.
APPLICATION FILED MAY 3, 1918.
1,357,664.
Patented Nov. 2, 1920.
3 SHEETS—SHEET 3.
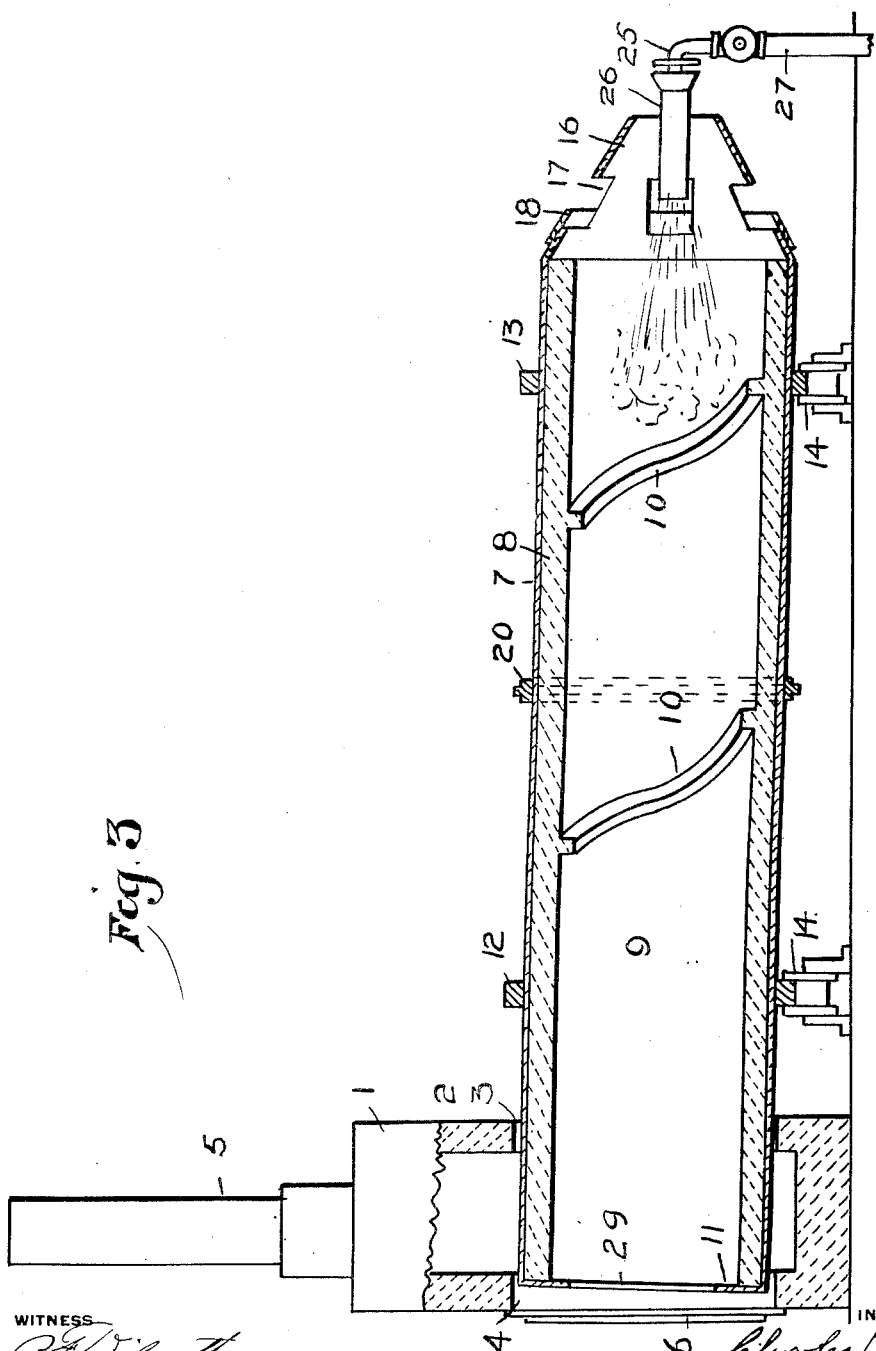

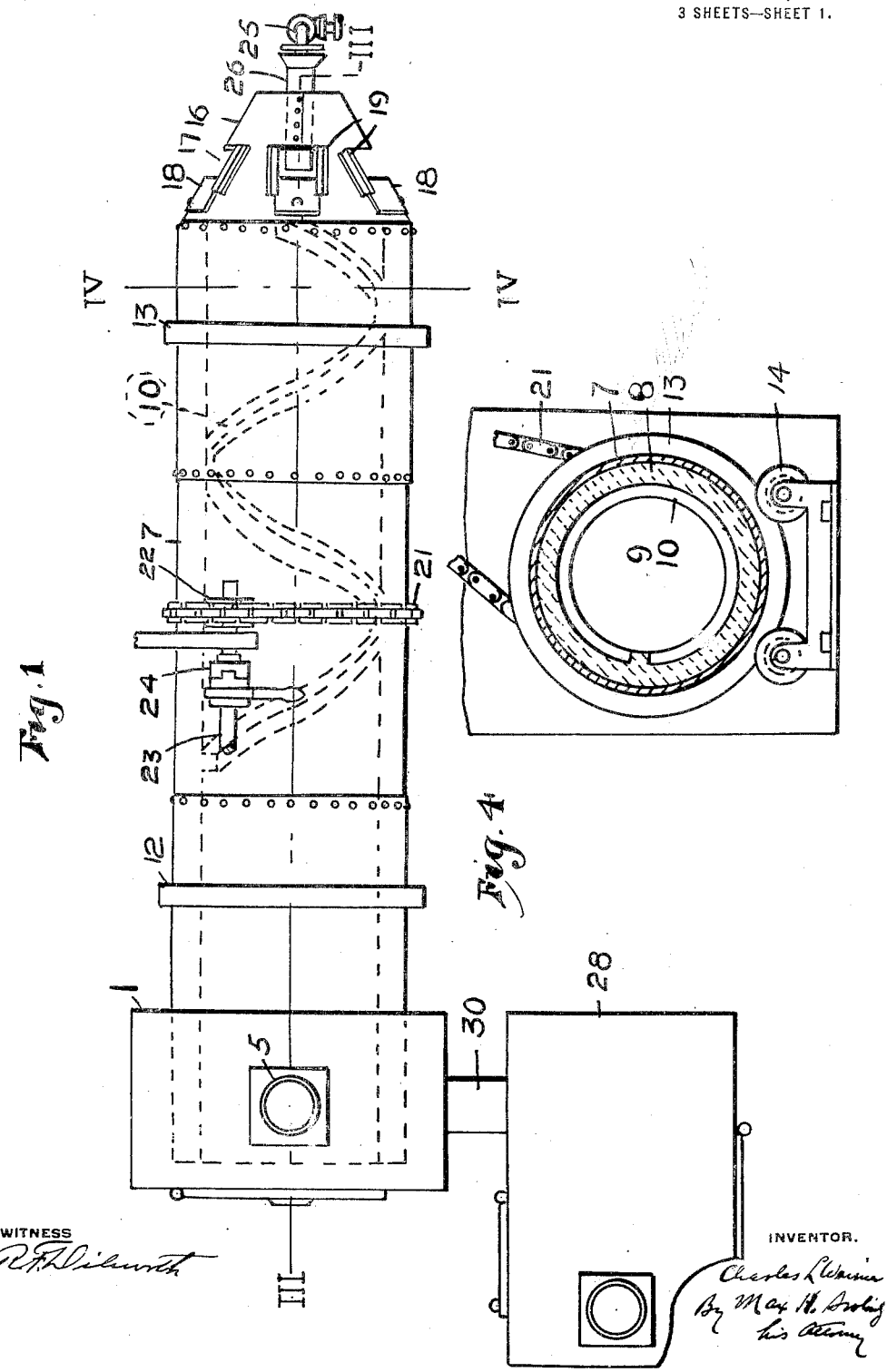

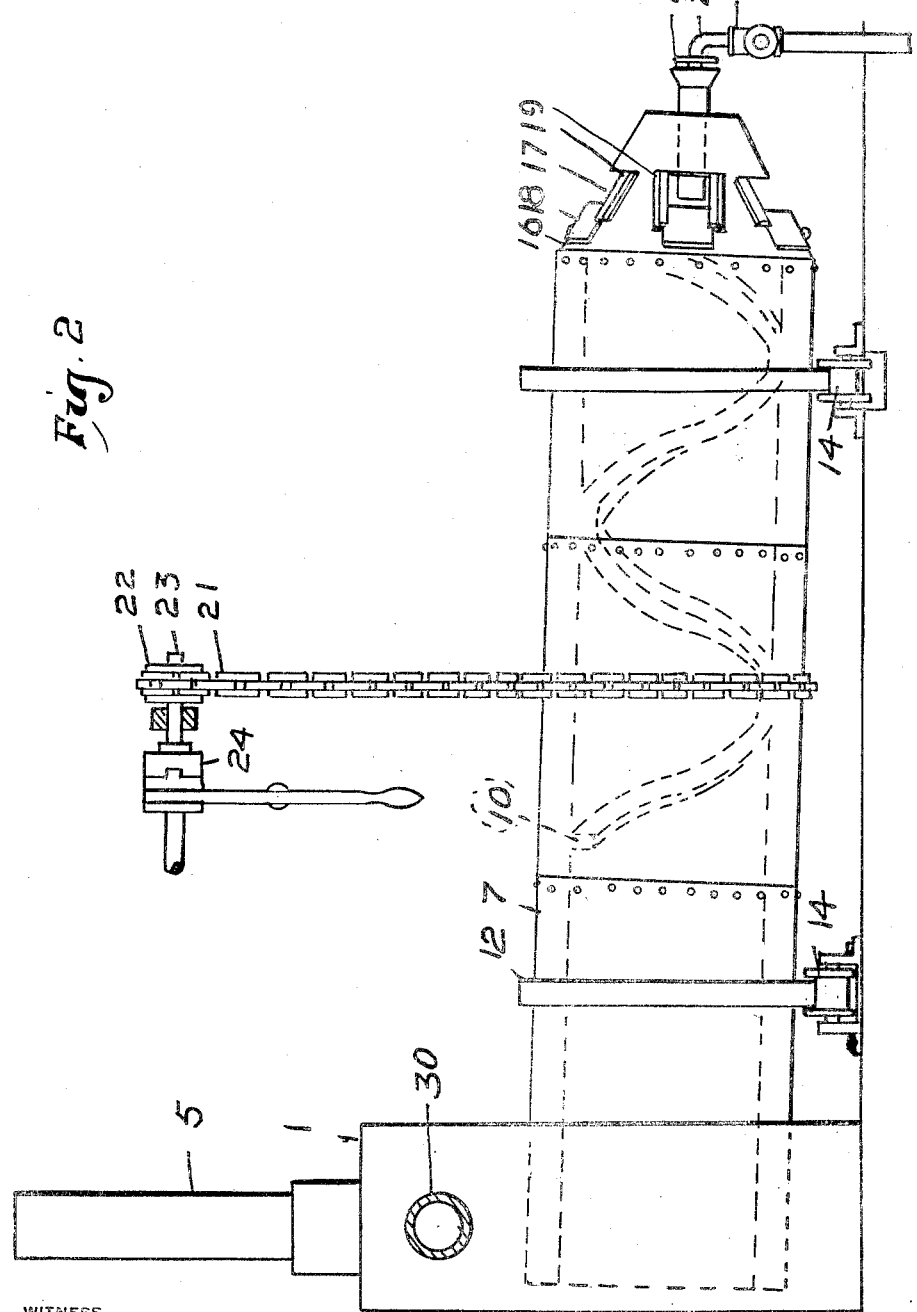

UNITED STATES PATENT OFFICE.

CHARLES L. WAISNER, OF NEW KENSINGTON, PENNSYLVANIA, ASSIGNOR TO MIRROR ROUGE COMPANY, OF TARENTUM, PENNSYLVANIA, A CORPORATION OF PENNSYLVANIA.

APPARATUS FOR MAUFACTURING ROUGE.

1,357,664. Specification of Letters Patent. Patented Nov. 2, 1920.

Application filed May 3, 1918. Serial No. 232,419.

*To all whom it may concern:*

Be it known that I, CHARLES L. WAISNER, a citizen of the United States, residing at New Kensington, in the county of Westmoreland and State of Pennsylvania, have invented certain new and useful Improvements in Apparatus for Manufacturing Rouge, of which the following is a specification.

This invention relates to an apparatus for burning or roasting copperas to produce rouge to be used as a polishing agent in the production of glass, and has for its object to provide, in a manner as hereinafter set forth, a method and apparatus for carrying the method into effect to uniformly burn or roast copperas to successfully produce rouge of a uniform quality and free from acid or containing any per cent. of acid desired.

In burning copperas, in order to produce rouge, it is absolutely essential that great care be exercised, as otherwise, a rouge of very uncertain composition will be produced. The chief points to be observed are that the copperas be evenly distributed over the bottom of the burning or roasting oven and that no part of the copperas be exposed to the heat more than the other parts, and during the burning or roasting step, it becomes necessary to very frequently change the position of the copperas, which is done by turning over the material being treated so that same may be exposed to uniform heating, and such uniform heating of the copperas body to produce a rouge of uniform quality is attained by the method and apparatus to be hereinafter referred to.

Further objects of the invention are to provide an apparatus for burning or roasting copperas to produce rouge which is simple, efficient, convenient in its use and comparatively inexpensive.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:

Figure 1 is a top plan view of an apparatus in accordance with this invention.

Fig. 2 is a side elevation of the apparatus.

Fig. 3 is a section on line III—III, Fig. 1.

Fig. 4 is a section on line IV—IV, Fig. 1.

In carrying out the method, the copperas is placed in a drying chamber and after being thoroughly dried, it is removed therefrom and placed in one end of a revolving furnace, the latter being pitched slightly downwardly to its discharge end. The furnace is heated to the desired temperature by the application of a heating medium at its discharge end. After the copperas has been supplied to the revolving furnace the latter is slowly revolved while the copperas travels toward the discharge end and during such travel is subjected to a heating agent, so that it will be properly burned or roasted. The revolving of the furnace keeps the copperas in motion. During the passage of the copperas through the furnace, its movement is accelerated by a spiral conveyer arranged within the furnace and against the wall thereof causing the copperas to turn over so that all particles thereof will be uniformly burned or roasted, thereby providing a rouge of uniform quality.

The spiral conveyer furthermore provides for the travel of the copperas toward the discharge end of the furnace and also assists in the even distribution of the copperas during the roasting and burning step.

Referring to the drawings in detail 1 denotes a vertically disposed support, provided with a chamber 2, and having its sides formed with openings 3, 4, which open into the chamber 2, intermediate the ends of the latter. An outlet stack 5, is provided for the chamber 2. A gate or closure 6, for the opening 4, is secured to the rear of the support 1. Extended through the opening 3, chamber 2, and into the opening 4, is a hollow cylindrical element constituting a revolving furnace.

The furnace consists of a cylindrical shell 7, having a lining 8, of fire-brick, and forming a part of said lining 8, as well as extending throughout the length thereof and also projecting into the roasting chamber 9, is a spiral conveyer 10.

The rear end of the shell 7, is formed with an inwardly extending annular flange 11, which abuts against the rear end of the lining 8. The shell 7, has fixed therewith a pair of spaced peripheral collars 12, 13, which are mounted on a pair of flanged rollers 14, secured in brackets 15, arranged below the furnace.

The furnace is disposed at an inclination, that is to say, it extends downwardly toward its discharge end and is supported not only through the medium of the wall of the opening 3, but also by the collars 12, 13, and the flange rollers 14.

The discharge end of the furnace is indicated at 16, and is reduced and tapering in contour. The said discharge end 16, has a series of outlet openings 17, which are closed by sliding gates 18, connected upon the periphery of the ends 16, by keepers 19.

The furnace is revolved through the medium of a toothed circumferentially extending rack 20, which is secured to the periphery of the shell 7, and a driving belt 21, which has operative engagement with the rack 20, and is driven by a sprocket pinion 22, carried by a driving shaft 23, adapted to be connected by clutch mechanisms 24, the prime movement not shown.

The chamber 9, is heated through the medium of a gas burner 25, which extends through the end 16, and has associated therewith a gas and air mixing element 26. The gas supply pipe is indicated at 27.

The reference character 28, denotes a drier, into which the copperas is placed to be thoroughly dried before it is supplied through the opening 4, into the inlet end 29, of the furnace. The drier is heated through the chamber 2, as indicated at 30.

What I claim is:

1. An apparatus for manufacturing rouge comprising a revoluble hollow longitudinally extending body forming a roasting chamber, a vertical support provided with a chamber having the side walls thereof formed with enlarged openings and the top wall with a stack leading from the chamber, said body having its rear end partly extended into one of the openings, said body extending across the chamber in the support and through the other of said openings and communicating at its rear with said chamber, and a closure for that opening into which the rear end of the body partly extends.

2. An apparatus for manufacturing rouge comprising a hollow elongated cylindrical body forming a roasting chamber having a conical outlet end, a burner extended into said outlet end centrally thereof, said outlet end having a series of rectangular discharge openings, keepers secured to the periphery of said end, and sliding gates for closing said openings, said gates coupled to said end by said keepers.

3. An apparatus for manufacturing rouge comprising a hollow elongated cylindrical shell having an inwardly extending annular flange at its rear end and a conical extension at its forward end provided with openings, a lining of refractory material for said shell, said lining extending from said flange to and clear of the extension and provided as a part thereof with a spiral conveyer on the forward portion thereof.

In testimony whereof I affix my signature.

CHARLES L. WAISNER.